(12) United States Patent
Matsukawa et al.

(10) Patent No.: US 10,883,153 B2
(45) Date of Patent: Jan. 5, 2021

(54) SLIDING MEMBER, CLUTCH PLATE, AND MANUFACTURING METHODS FOR THE SAME

(71) Applicant: JTEKT CORPORATION, Osaka (JP)

(72) Inventors: Kazutaka Matsukawa, Kariya (JP); Hiroyuki Ando, Takahama (JP); Yasunari Saito, Chiryu (JP); Hideyuki Saito, Kariya (JP); Kazuhiro Fukushima, Okazaki (JP); Tomoyuki Nanba, Aisai (JP)

(73) Assignee: JTEKT CORPORATION, Osaka (JP)

( * ) Notice: Subject to any disclaimer, the term of this patent is extended or adjusted under 35 U.S.C. 154(b) by 1136 days.

(21) Appl. No.: 15/165,777

(22) Filed: May 26, 2016

(65) Prior Publication Data

US 2016/0348737 A1 Dec. 1, 2016

(30) Foreign Application Priority Data

Jun. 1, 2015 (JP) .................................. 2015-111298

(51) Int. Cl.
*C21D 9/00* (2006.01)
*C23C 28/04* (2006.01)
(Continued)

(52) U.S. Cl.
CPC .............. *C21D 9/0068* (2013.01); *C23C 8/26* (2013.01); *C23C 8/34* (2013.01); *C23C 28/044* (2013.01); *F16D 13/648* (2013.01); *F16D 27/115* (2013.01); *F16D 69/00* (2013.01); *F16D 69/02* (2013.01); *F16D 2023/123* (2013.01)

(58) Field of Classification Search
CPC ...................................................... C21D 9/0068
See application file for complete search history.

(56) References Cited

U.S. PATENT DOCUMENTS 4,496,401 A * 1/1985 Dawes ................. C21D 9/0068
148/217
5,228,929 A * 7/1993 Panasiuk ................... B22F 3/24
148/220

(Continued)

FOREIGN PATENT DOCUMENTS

JP  2000-337410 A  12/2000
JP  2013-108145     6/2013
JP  2014-136811 A   7/2014

OTHER PUBLICATIONS

Office Action dated Aug. 28, 2018 in Japanese Patent Application No. 2015-111298 with unedited computer generated English translation retrieving from the Global Dossier, citing documents AO and AP therein, 11 pages.

*Primary Examiner* — Christopher S Kessler
(74) *Attorney, Agent, or Firm* — Oblon, McClelland, Maier & Neustadt, L.L.P.

(57) ABSTRACT

In a manufacturing method for a sliding member, a nitrogen diffusion layer, a nitrogen compound layer, and an oxidation layer are formed by executing a first step of cooling a workpiece formed of a steel material after heating the workpiece in an atmosphere containing ammonia at 570 to 660° C., a second step of performing, subsequently to the first step, tempering while pressurizing a front surface side of the workpiece, and a third step of performing, subsequently to the second step, steam treatment of heating the workpiece in a steam atmosphere.

5 Claims, 10 Drawing Sheets

(51) Int. Cl.
*C23C 8/34* (2006.01)
*C23C 8/26* (2006.01)
*F16D 27/115* (2006.01)
*F16D 13/64* (2006.01)
*F16D 69/00* (2006.01)
*F16D 23/12* (2006.01)
*F16D 69/02* (2006.01)

(56) References Cited

U.S. PATENT DOCUMENTS

2014/0197003 A1    7/2014  Ando et al.
2015/0225835 A1*   8/2015  Larsson .................... C23C 8/80
                                                       148/219

* cited by examiner

SLIDING MEMBER, CLUTCH PLATE, AND MANUFACTURING METHODS FOR THE SAME

INCORPORATION BY REFERENCE

The disclosure of Japanese Patent Application No. 2015-111298 filed on Jun. 1, 2015 including the specification, drawings and abstract, is incorporated herein by reference in its entirety.

BACKGROUND OF THE INVENTION

1. Field of the Invention

The invention relates to a sliding member, a clutch plate, and manufacturing methods for the sliding member and the clutch plate.

2. Description of the Related Art

Japanese Patent Application Publication No. 2013-108145 (JP 2013-108145 A) describes a manufacturing method for a clutch plate in an electromagnetic clutch apparatus as a manufacturing method for a sliding member. The manufacturing method for a sliding member described in JP 2013-108145 A involves heating a workpiece formed of a steel material in an atmosphere containing ammonia at 660 to 690° C. for 0.5 to 1.5 hours, then cooling the workpiece by oil quenching at an oil temperature of 60 to 80° C., and finally tempering the workpiece at 250 to 350° C. under pressure. Thus, a nitrogen compound layer and a nitrogen diffusion layer are each formed to have a thickness of approximately 20 to 50 µm.

When a sliding member such as a clutch plate is used for a long time, a surface of the sliding member is worn off to change a contact area over which the sliding member contacts another member. Consequently, a torque transmitted between these members increases. Therefore, there has been a demand to enhance wear resistance of the sliding member such as a clutch plate. The surface of the sliding member such as a clutch plate needs to have a high flatness.

SUMMARY OF THE INVENTION

An object of the invention is to provide a manufacturing method for a sliding member and a sliding member that allow wear resistance to be enhanced and that enable a relatively high flatness to be achieved.

A manufacturing method for a sliding member according to a first aspect of the invention includes: a first step of heating a base material portion formed of a steel material in an atmosphere containing ammonia at 570 to 660° C. and then cooling the base material portion; a second step of tempering, subsequently to the first step, the base material portion while pressurizing a front surface side of the base material portion; and a third step of performing, subsequently to the second step, steam treatment on the base material portion by heating the base material portion in a steam atmosphere. By the first to third steps, a nitrogen diffusion layer is formed on the front surface side of the base material portion that is the steel material, a nitrogen compound layer is formed on a front surface side of the nitrogen diffusion layer, and an oxidation layer is formed on an outermost surface of the nitrogen compound layer.

The manufacturing method for a sliding member may be a manufacturing method for a clutch plate.

A sliding member according to a second aspect of the invention is a sliding member manufactured by the manufacturing method for a sliding member according to the first aspect. The nitrogen diffusion layer is 5 to 50 µm in thickness. The nitrogen compound layer is 5 to 50 µm in thickness. The oxidation layer is 0.3 to 3 µm in thickness.

The sliding member according to the second aspect may be a clutch plate included in an electromagnetic clutch.

In the above-described manufacturing method for a sliding member and the above-described sliding member, the steam treatment is performed in the third step, so that a dense oxidation layer containing triiron tetraoxide can be formed on the outermost surface of the nitrogen compound layer. This enables possible adhesive wear to be suppressed, allowing wear resistance of the sliding member to be enhanced.

The steam treatment in the third step is performed subsequently to the tempering in the second step, so that a relatively high flatness can be achieved. Given that (instead of the tempering) the steam treatment is performed subsequently to the cooling in the first step, residual austenite is transformed into martensite with a workpiece unpressurized during the steam treatment. Thus, the workpiece is hardened with distortion of the workpiece occurring during the first step not eliminated. Therefore, even when the workpiece is subsequently tempered under pressure, the resultant sliding member has a reduced flatness.

The tempering in the second step is performed subsequently to the cooling in the first step, so that an appropriate flatness can be achieved. In the tempering, the workpiece is pressurized to transform the residual austenite into martensite with possible distortion eliminated, thereby further improving the flatness. In the tempering, the residual austenite is transformed into martensite, allowing the sliding member to have an appropriate hardness at the front surface side thereof.

The heating is performed in the atmosphere containing ammonia. Thus, the workpiece is nitrided by the heating. A temperature for the heating is at 570 to 660° C. Heating at 570° C. or higher reliably allows each of the nitrogen compound layer and the nitrogen diffusion layer to have a thickness of 5 to 50 µm. A heating temperature of 660° C. or lower allows possible diffusion (extinction) of the nitride compound to be suppressed. Therefore, the sliding member can have the appropriate hardness at the front surface side thereof.

Since the nitrogen compound layer and the nitrogen diffusion layer each have a thickness of 5 to 5 µm, the sliding member can be made to have a high hardness at the front surface side thereof. Since the oxidation layer has a thickness of 0.3 to 3 µm, appropriate wear resistance can be reliably offered.

The above-described manufacturing method for a clutch plate and the above-described clutch plate produce the same effects as those of the above-described manufacturing method for a sliding member and the above-described sliding member. The nitrogen compound layer and the nitrogen diffusion layer are each 50 µm or less in thickness. A thickness of more than 50 µm reduces magnetic permeability, leading to a reduced magnetic flux density of clutch plates and a reduced frictional engaging force between the clutch plates. Thus, the thickness is set to 50 µm or less.

The above-described clutch plate offers a high wear resistance, and thus, the depth of wear of the clutch plate is kept small even when the clutch plate is used for a long period of time. Therefore, the contact area between the clutch plates is prevented from being significantly changed. This enables a reduction in the rate of change in transmission torque resulting from a long period of use.

The tempering allows the residual austenite that is contained in the nitrogen compound layer and the nitrogen diffusion layer and is nonmagnetic to be transformed into martensite, which is magnetic. This increases the magnetic permeability and hardness of the clutch plate.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A sliding member or a clutch plate in the invention will be described with reference to the drawings. A surface structure of the sliding member or the clutch plate will be described with reference to FIG. 1. The sliding member or the clutch plate is obtained by performing nitriding and steam treatment on a front surface of a workpiece formed of a steel material such as carbon steel. Examples of the sliding member include an iron-based clutch plate for an LSD clutch and a brake pad, in addition to a clutch plate included in an electromagnetic clutch apparatus.

Figure 1:
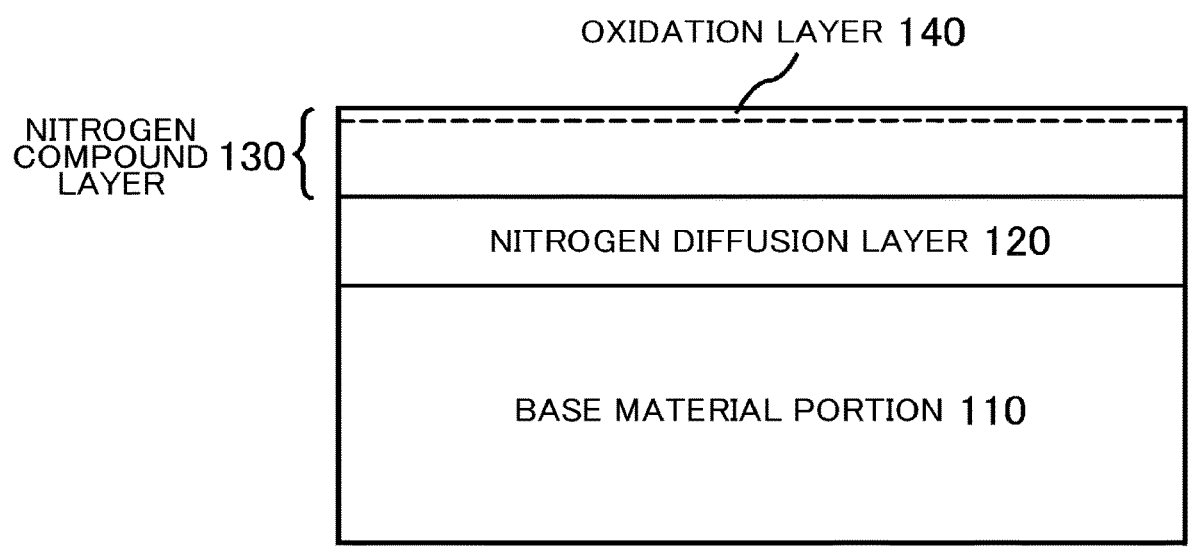
FIG. 1 is a diagram depicting a surface structure of a sliding member or a clutch plate that is an embodiment of the invention.

As depicted in FIG. 1, the sliding member includes a base material portion 110 formed of a steel material, a nitrogen diffusion layer 120 formed on a front surface side of the base material portion 110 to have a thickness of 5 to 50 μm, a nitrogen compound layer 130 formed on a front surface side of the nitrogen diffusion layer 120 to have a thickness of 5 to 50 μm, and an oxidation layer 140 formed on an outermost surface of the nitrogen compound layer 130 to have a thickness of 0.3 to 3 μm.

For the workpiece, a steel material with a carbon content of 0.10 to 0.20% is used. In general, carbon steel with a lower carbon content is less expensive, but making a surface of such carbon steel harder is not easy. However, the invention allows the surface even of a low-carbon steel such as S15C to be made harder as described below. The base material portion 110 is the same as the workpiece.

In the nitrogen diffusion layer 120 is a solid solution containing nitrogen. The nitrogen compound layer 130 is a layer containing a nitrogen compound such as $Fe_2N$. The oxidation layer 140 is an oxide film containing triiron tetraoxide as a main component.

Now, a heat treatment method (manufacturing method) for the surface of the sliding member or the clutch plate will be described with reference to a flowchart in FIG. 2. Pre-oxidation is performed on the workpiece (S1; a pre-oxidation step corresponding to a fourth step). The pre-oxidation is a treatment performed before nitriding. The pre-oxidation promotes a nitriding reaction of the workpiece. In the pre-oxidation, the workpiece is oxidized in an oxidation atmosphere at 300 to 450° C. (preferably 340 to 440° C.), which is a heating temperature Te1. Specifically, as depicted in FIG. 3, a temperature in a treatment chamber with a volume of 1 to 3 $m^3$ is elevated to the heating temperature Te1. After the temperature elevation is completed, the heating temperature Te1 is maintained for a time Ti1. The time Ti1 is one to two hours.

Figure 2:
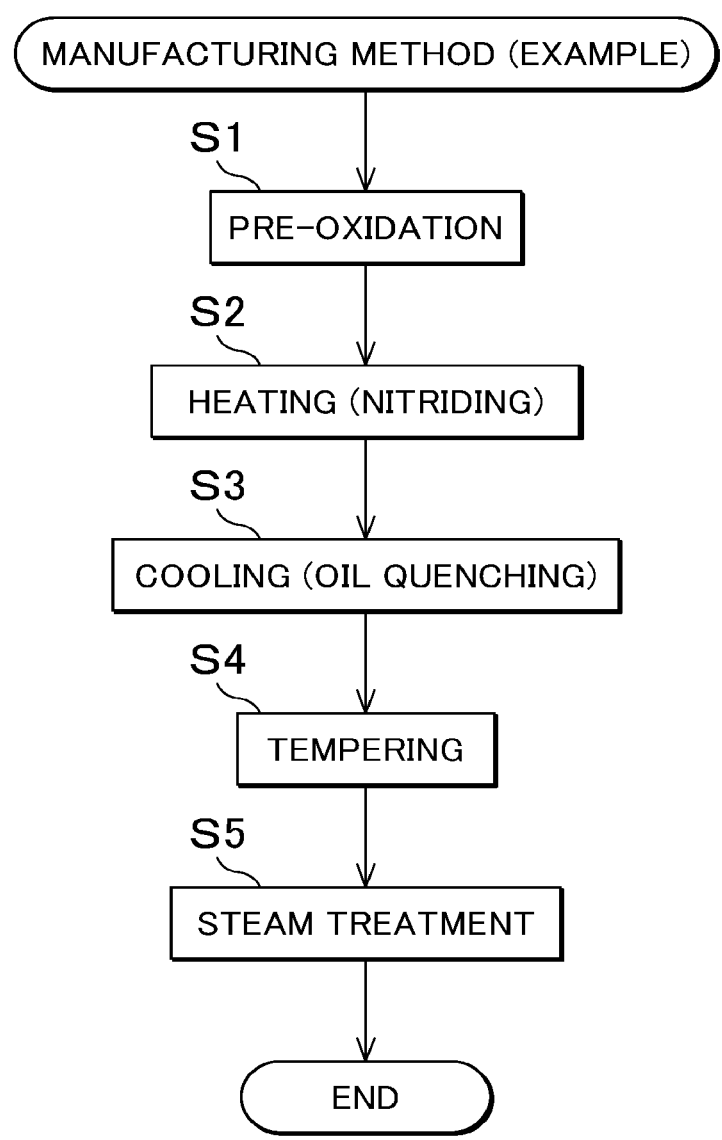
FIG. 2 is a flow chart illustrating a manufacturing method for the sliding member or the clutch plate depicted in FIG. 1 (Example)
Figure 3:
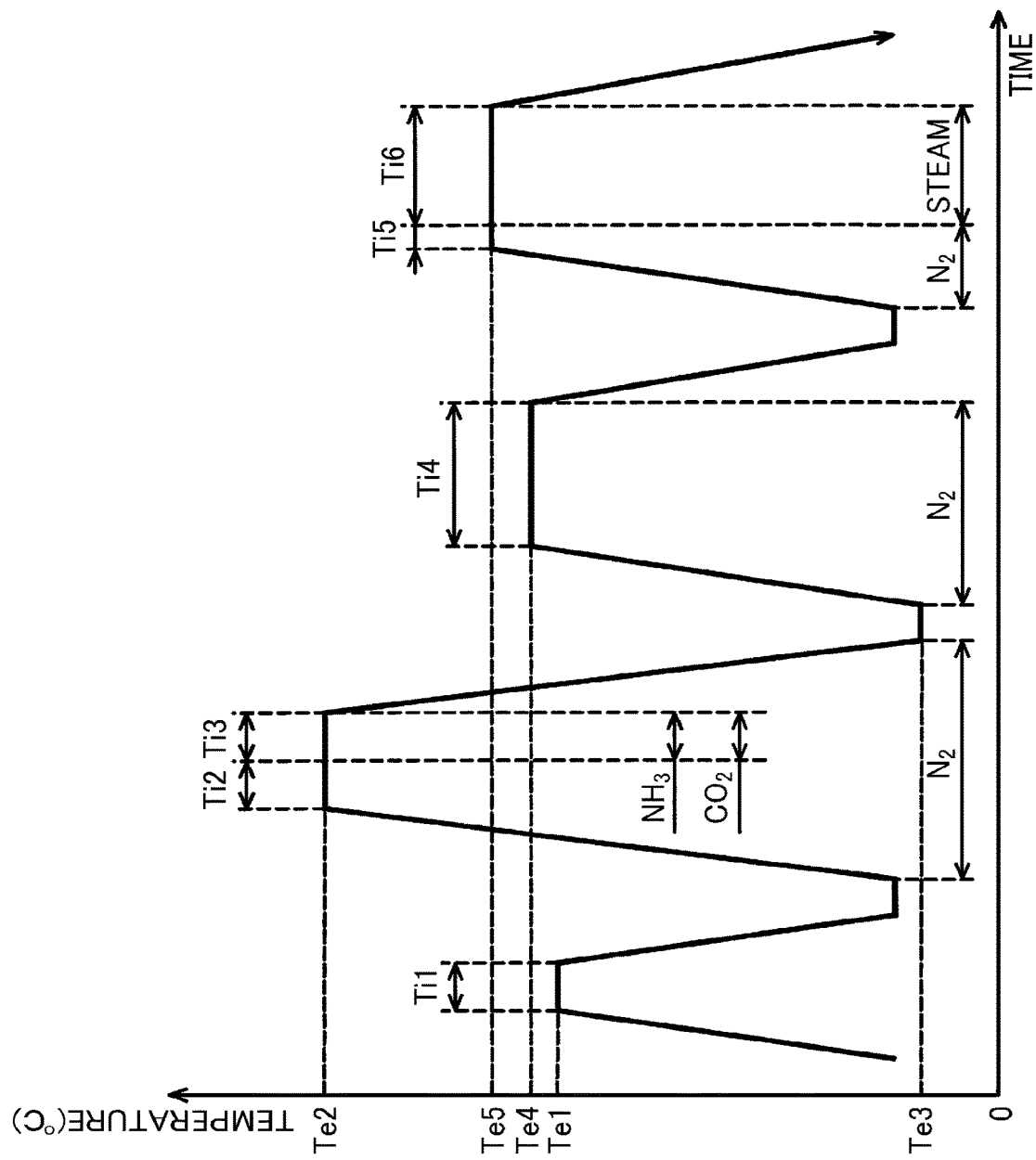
FIG. 3 is a process diagram for heat treatment in FIG. 2 (Example)

Subsequently to the pre-oxidation (S1), heating (S2, a heating step) is performed as illustrated in FIG. 2. The heating is performed on the workpiece in an ammonia atmosphere (an atmosphere containing ammonia) at 570 to 660° C. (preferably 600 to 650° C.), which is a heating temperature Te2. Specifically, the heating is performed as illustrated in FIG. 3. First, the workpiece is held in the treatment chamber with a volume of 1 to 3 $m^3$. At this time, an atmosphere temperature in the treatment chamber is 500° C. or lower. Then, the atmosphere temperature in the treatment chamber starts to elevate toward the heating temperature Te2. During the temperature elevation, a nitrogen ($N_2$) gas is supplied at 0 to 5 $m^3/H$. After the temperature elevation is completed, the heating temperature Te2 is maintained for a time Ti2. The time Ti2 is 0 to 1 hour. At this time, the temperature in the treatment chamber is uniformized, and the workpiece is preheated.

After the time Ti2 passes, the atmosphere temperature is further maintained constant at the heating temperature Te2 for a time Ti3. The time Ti3 is 0.5 to 1.5 hours. During the time Ti3, the inside of the treatment chamber is kept in an ammonia atmosphere. Specifically, an ammonia ($NH_3$) gas is supplied at 3 to 7 $m^3/H$, and a carbon dioxide ($CO_2$) gas at 0.1 to 0.6 $m^3/H$. At this time, the workpiece is nitrided. Supply of nitrogen gas may be omitted in the ammonia atmosphere.

Subsequently to the heating (S2), cooling (S3, a cooling step) is performed as illustrated in FIG. 2. The cooling in the present embodiment is performed by oil quenching. Specifically, as depicted in FIG. 3, the workpiece is placed in quenching oil at an oil temperature Te3 of 60 to 80° C. in a nitrogen atmosphere. At this time, the workpiece is prevented from being oxidized. In the cooling, transformation into martensite progresses relatively slowly, leading to residual austenite. The above-described heating step and the cooling step correspond to the first step.

Once the temperature of the workpiece reaches the temperature Te3 for cooling during the cooling (S3), tempering (S4; a tempering step corresponding to a second step) is performed as illustrated in FIG. 3. Specifically, in the tempering, the workpiece with a front surface side thereof pressurized is placed in a heating furnace with a volume of 1 to 3 $m^3$ in a nitrogen atmosphere at a furnace temperature Te of 200 to 470° C. (preferably 300 to 450° C.) and maintained therein for a time Ti4, as depicted in FIG. 3. The time Ti4 is 2 to 5 hours. The tempering is also referred to as press tempering. At this time, the residual austenite is transformed into martensite.

Subsequently to the tempering (S4), steam treatment (S5; a steam treatment step corresponding to a third step) is performed as illustrated in FIG. 2. The steam treatment is performed on the workpiece in a steam atmosphere at 350 to 500° C. (preferably 390 to 480° C.), which is a treatment temperature Te5. Specifically, first, the workpiece is held in the treatment chamber with a volume of 1 to 3 m³. Then, the atmosphere temperature in the treatment chamber starts to elevate toward the treatment temperature Te5, as depicted in FIG. 3. During the temperature elevation, a nitrogen ($N_2$) gas is supplied at 1 to 8 m³/H. After the temperature elevation is completed, the temperature is maintained for a time Ti5. The time Ti5 is 0.5 to 1 hour. At this time, the temperature in the treatment chamber is uniformized, and the workpiece is preheated.

After the time Ti5 passes, the atmosphere temperature is further maintained constant at the heating temperature Te5 for a time Ti6. The time Ti6 is 2 to 4 hours. The inside of the treatment chamber is kept in a steam atmosphere for the time Ti6. Specifically, steam is supplied at 80 to 100 m³/H. At this time, an oxide film of triiron tetraoxide is formed on the workpiece. The steam treatment is also referred to as vapor treatment.

The above-described treatments are performed to form the oxidation layer 140, the nitrogen compound layer 130, and the nitrogen diffusion layer 120 on the front surface of the workpiece as depicted in FIG. 1.

When the oxidation layer 140 is formed, instead of the above-described steam treatment, the following treatment may be performed. For example, metallic iron may oxidized by a Laux process. In the Laux process, when nitrobenzene is caused to react with metallic iron using iron chloride as a catalyst, to obtain aniline, triiron tetraoxide is generated. Alternatively, triiron tetraoxide may be generated by, for example, performing aeration on iron (II) salt such as iron hydroxide (II) with pH thereof controlled. Alternatively, triiron tetraoxide may be generated by reducing triiron dioxide using hydrogen or carbon monoxide.

The pre-oxidation step may be omitted from the above-described manufacturing method.

Then, the member obtained by the manufacturing method in the present embodiment is evaluated for flatness (distortion change rate) of the sliding member and the depth of wear resulting from endurance friction tests on the actual machine, in which the member is applied to a clutch plate.

Example in the present embodiment is application of the manufacturing method illustrated in FIG. 2 and FIG. 3. In Example, carbon steel (JIS G4051 (revised in 2009): S12C) is used as the workpiece, the treatment chamber has a volume of 2 m³, and in the pre-oxidation step, the heating temperature Te1 is 420° C. and the time Ti1 is one hour.

In the heating step, the heating temperature Te2 is 640° C., the time Ti2 is 60 minutes, and a nitrogen gas is supplied at 0.6 m³/H. The time Ti3 is 65 minutes, an ammonia gas is supplied at 5 m³/H, and a carbon dioxide gas is supplied at 0.3 m³/H.

The oil temperature Te3 in the cooling step is 70° C. As cooling oil (quenching oil) for the cooling step, high-performance high-speed quenching oil for vacuum heat treatment corresponding to JIS Class 1 No. 2 for paraffin-based base oil (kinematic viscosity: 16±2.5 mm²/s (40° C.), a flash point (COC): 178° C., cooling performance characteristic temperature: 620° C., brand name: Special Quenching Oil V-1700S (manufactured by NIPPON GREASE CO., LTD.)) is used.

In the tempering step, the furnace temperature Te4 is 450° C., the time Ti4 is 3 hours, and a nitrogen gas is supplied at 2 m³/H.

In the steam treatment step, the treatment temperature Te5 is 450° C., the time Ti5 is 30 minutes, and the time Ti6 is 2.5 hours. Nitrogen gas is supplied at 7 m³/H, and steam is supplied at 90 m³/H.

Figure 4:
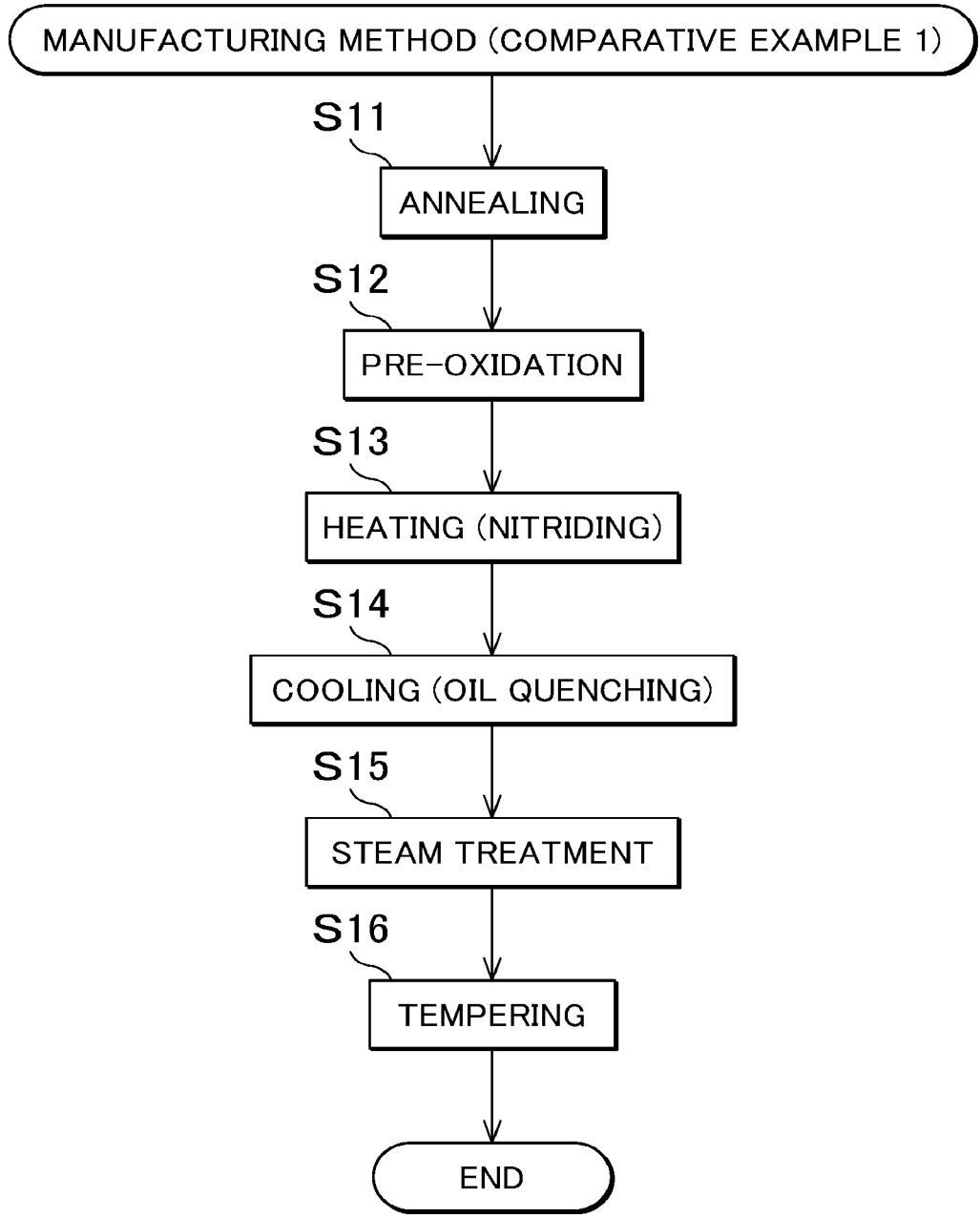
FIG. 4 is a flowchart illustrating a manufacturing method in Comparative Example 1.
Figure 5:
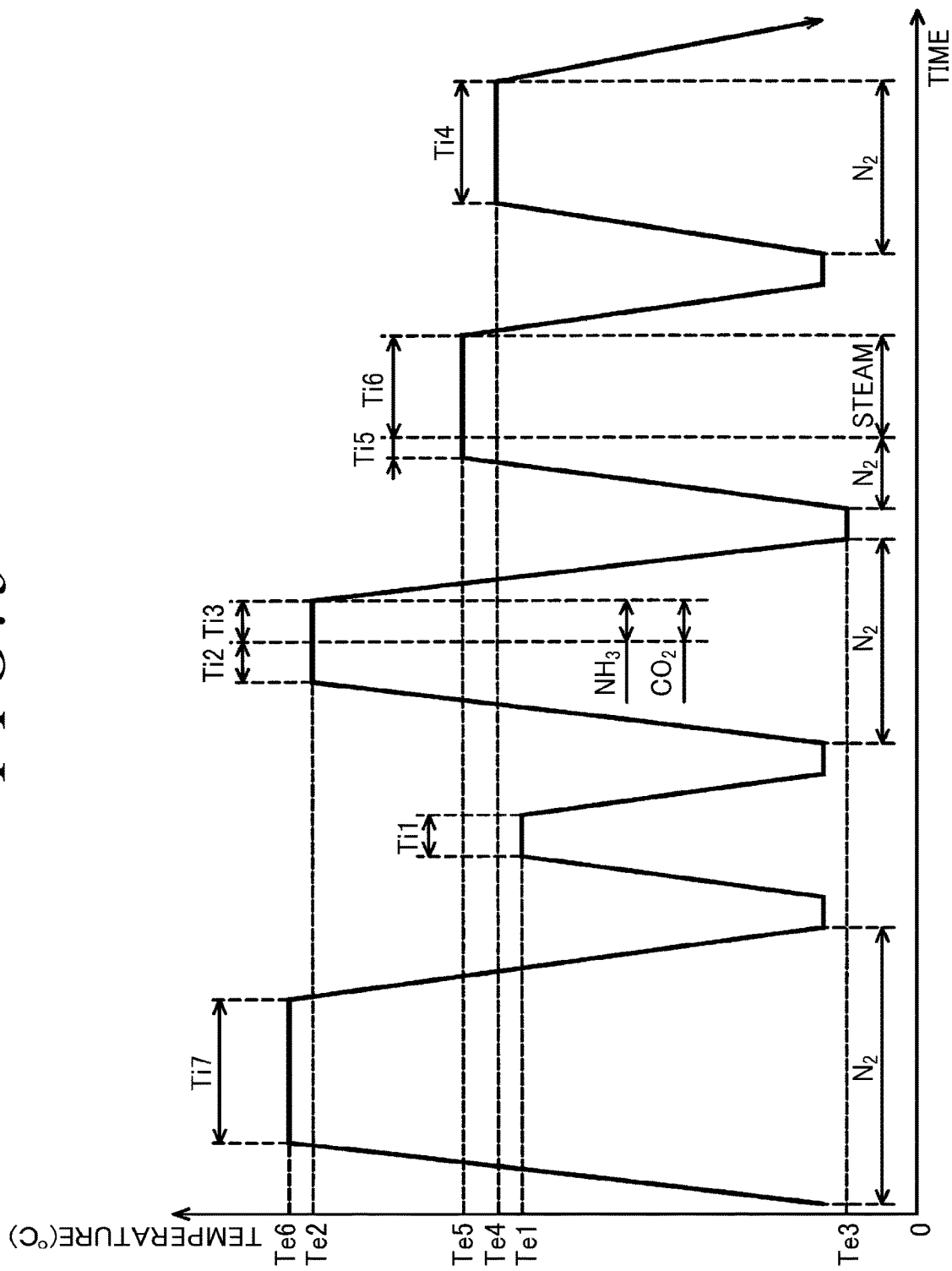
FIG. 5 is a process diagram for heat treatment in FIG. 4 (Comparative Example 1)

In Comparative Example 1, a flowchart illustrated in FIG. 4 and a heat treatment process illustrated in FIG. 5 are applied. As the workpiece in this case, the same carbon steel as that in Example is used. Specifically, an annealing step (S11), a pre-oxidation step (S12), a heating step (S13), a cooling step (S14), a steam treatment step (S15), and a tempering step (S16) are executed in order. The steps other than the annealing step (S11) are similar to the steps in Example described above. That is, Comparative Example 1 is different from the Example described above in that the annealing step (S11) is added and that the steam treatment step (S15) and the tempering step (S16) are executed in reverse order.

The annealing step (S11) is executed in a nitrogen atmosphere at 600 to 700° C. (preferably 620 to 680° C.), which is a heating temperature Te6. Specifically, as depicted in FIG. 5, with the front surface side of the workpiece pressurized, the temperature in the treatment chamber with a volume of 2 m³ is elevated to the heating temperature Te6. After the temperature elevation is completed, the heating temperature Te6 is maintained for a time Ti7. The time Ti7 is 3 to 5 hours. Consequently, residual stress on the workpiece resulting from press molding is released, suppressing possible distortion in the subsequent steps. The annealing step is also referred to as hot press. In Comparative Example 1, the heating temperature Te6 is 650° C., and the time Ti7 is 3.5 hours.

Figure 6:
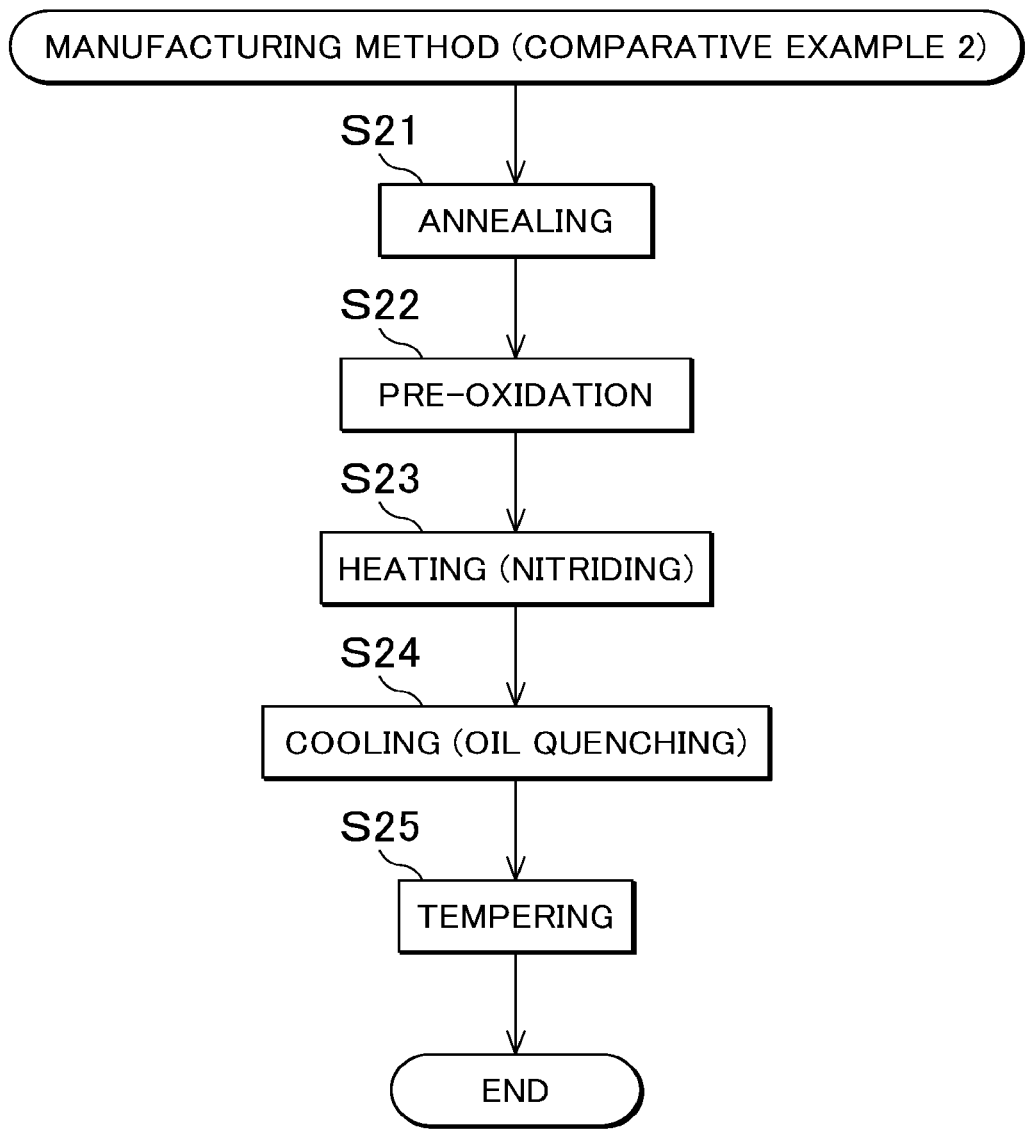
FIG. 6 is a flowchart illustrating a manufacturing method in Comparative Example 2.

In Comparative Example 2, a flowchart illustrated in FIG. 6 is applied. As the workpiece in this case, the same carbon steel as that in Example is used. Specifically, an annealing step (S21), a pre-oxidation step (S22), a heating step (S23), a cooling step (S24), and a tempering step (S25) are executed in order. The steps are similar to the steps in Example and Comparative Example 1 described above. Comparative Example 2 is different from Comparative Example 1 described above in that the steam treatment step is not executed.

Figure 7:
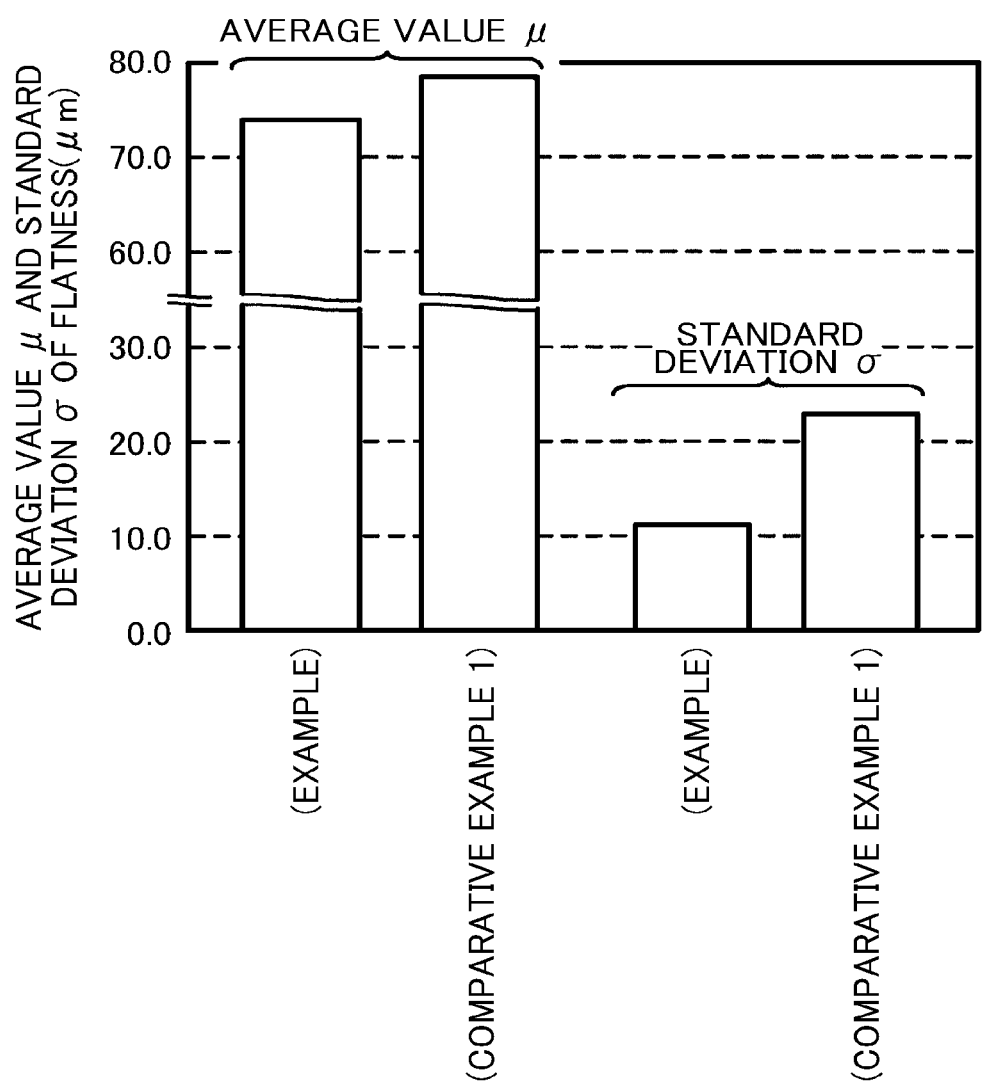
FIG. 7 is a graph illustrating an average value and a standard deviation for flatness of each of the members in Example and Comparative Example 1.

A comparison between the sliding members in Example and Comparative Example 1 is performed in terms of an average value μ and a standard deviation σ for flatness. An evaluation number n is 25. As depicted in FIG. 7, the average value μ is 74.0 μm and the standard deviation σ is 11.2 in Example, whereas the average value μ is 78.4 μm and the standard deviation σ is 22.9 in Comparative Example 1. In spite of the annealing executed in Comparative Example 1, flatness is higher in Example than in Comparative Example 1. The reason for the result is expected as follows. That is, when the steam treatment step is executed after the cooling step in Comparative Example 1, the residual austenite is transformed into martensite with the workpiece unpressurized, so that the workpiece fails to undergo structural transformation in the subsequent tempering step. Thus, pressurization-based straightening effect for achieving an appropriate flatness is degraded.

Figure 10:
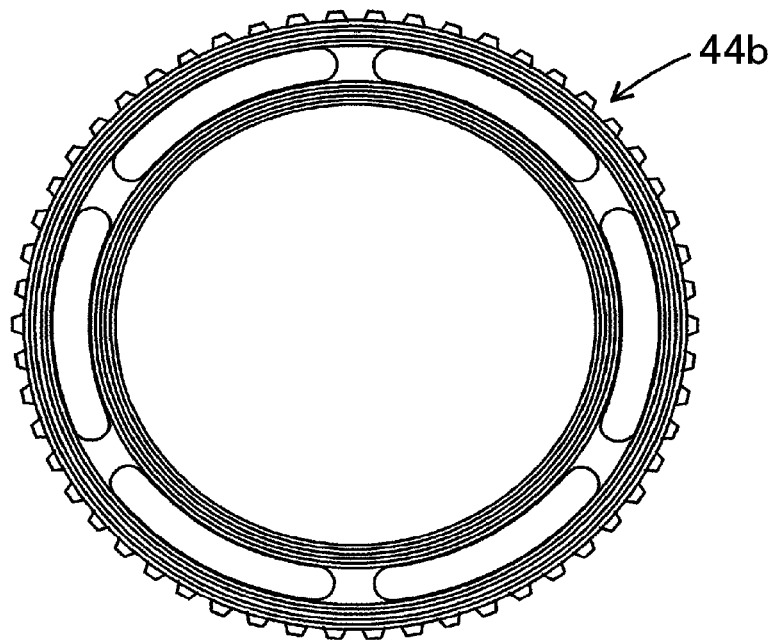
FIG. 10 is a diagram of an outer plate in FIG. 9 as seen in an axial direction, in which loop lines depict grooves.
Figure 11:
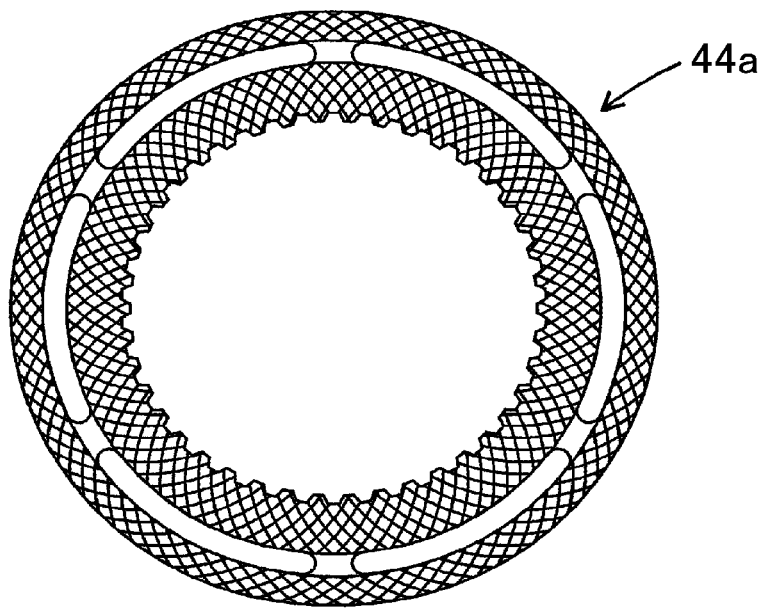
FIG. 11 is a diagram of an inner plate in FIG. 9 as seen in the axial direction, in which cross lines depict grooves.

Endurance friction tests on the actual machine were conducted on the sliding members in Example and Comparative Examples 1 and 2. In the tests, an electromagnetic clutch included in a driving-force transmission apparatus was applied. Specifically, the surface treatment in Example and Comparative Examples was applied to an outer pilot clutch plate 44b (depicted in FIG. 9 and FIG. 10) included in the electromagnetic clutch and having a plurality of concentric annular grooves. A diamond-like carbon (DLC) film was coated on an inner pilot clutch plate 44a (depicted in FIG. 9 and FIG. 11) paired with the outer pilot clutch plate 44b and having a plurality of crossing grooves. The endurance tests were conducted under test conditions including an electromagnetic-clutch-portion surface pressure of 0.2 MPa, a slipping velocity of 0.02 m/s, lubrication with a coupling fluid (kinematic viscosity: 23 mm$^2$/s (40° C.)), a coupling surface temperature of 90 to 100° C., an endurance time corresponding to 480-h continuous slip, and an energy of 380 W.

Then, the depths of wear resulting from the friction tests in Example, Comparative Example 1, and Comparative Example 2 were measured. The smaller depth of wear of the surfaces of the plates 44a and 44b resulting from the friction tests is evaluated as higher endurance.

Figure 8:
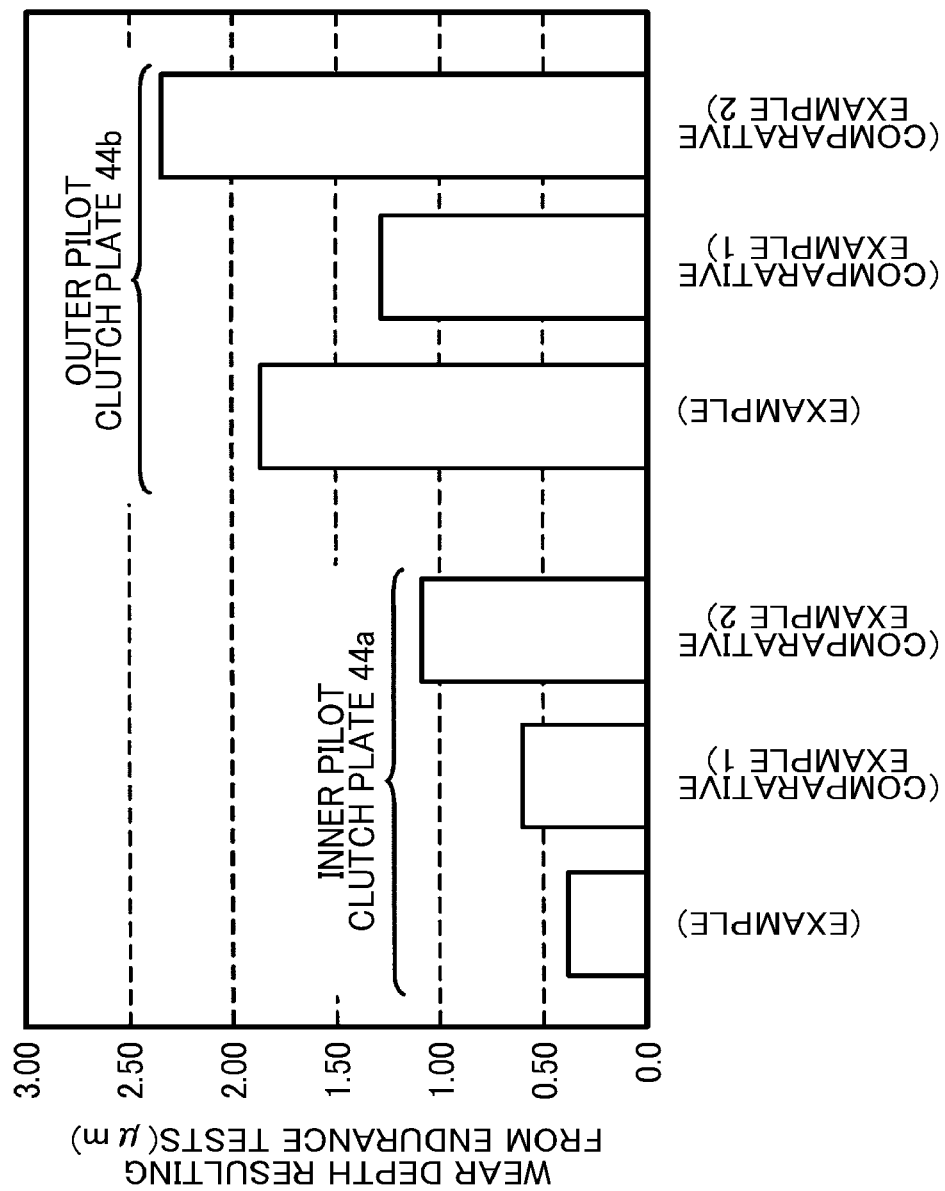
FIG. 8 is a graph illustrating the depth of wear resulting from endurance friction tests on the actual machine for each of the members in Example and Comparative Examples 1 and 2.

As depicted in FIG. 8, for the inner pilot clutch plate 44a, the depth of wear was 0.38 μm and 0.60 μm in Example and Comparative Example 1, respectively, where the steam treatment was performed, whereas the depth of wear was 1.08 μm in Comparative Example 2, where the steam treatment was not performed. For the outer pilot clutch plate 44b, the depth of wear was 1.87 μm and 1.28 μm in Example and Comparative Example 1, respectively, whereas the depth of wear was 2.35 μm in Comparative Example 2. The depth of wear in Example and Comparative Example 1 is expected to be lower than the depth of wear in Comparative Example 2 because the oxidation layer 140 is formed by the steam treatment in Example and Comparative Example 1, whereas the oxidation layer 140 is not formed in Comparative Example 2.

The present embodiment provides a manufacturing method for a sliding member including the base material portion 110 formed of a steel material, the nitrogen diffusion layer 120 formed on the front surface side of the base material portion 110, the nitrogen compound layer 130 formed on the front surface side of the nitrogen diffusion layer 120, and the oxidation layer 140 formed on the outermost surface of the nitrogen compound layer 130. In the manufacturing method for the sliding member, the nitrogen diffusion layer 120, the nitrogen compound layer 130, and the oxidation layer 140 are formed by executing the heating step of heating the workpiece formed of a steel material in an atmosphere containing ammonia at 570 to 660° C., the cooling step of cooling the workpiece after executing the heating step, the tempering step of tempering, subsequently to the cooling step, the workpiece while pressurizing the front surface side of the workpiece, and the steam treatment step of performing, subsequently to the tempering step, steam treatment of heating the workpiece in a steam atmosphere.

The sliding member includes the base material portion 110 formed of a steel material, the nitrogen diffusion layer 120 formed on the front surface side of the base material portion 110 to have a thickness of 5 to 50 μm, the nitrogen compound layer 130 formed on the front surface side of the nitrogen diffusion layer 120 to have a thickness of 5 to 50 μm, and the oxidation layer 140 formed on the outermost surface of the nitrogen compound layer 130 to have a thickness of 0.3 to 3 μm. The nitrogen diffusion layer 120, the nitrogen compound layer 130, and the oxidation layer 140 are formed by executing the heating step of heating the workpiece formed of a steel material in an atmosphere containing ammonia, the cooling step of cooling the workpiece after executing the heating step, the tempering step of tempering, subsequently to the cooling step, the workpiece while pressurizing the front surface side of the workpiece, and the steam treatment step of performing, subsequently to the tempering step, steam treatment of heating the workpiece in a steam atmosphere.

As described above, the steam treatment performed in the steam treatment step allows a dense oxidation layer 140 of triiron tetraoxide to be formed on the outermost surface of the nitrogen compound layer 130. This enables possible adhesive wear to be suppressed, thereby enhancing wear resistance of the sliding member.

The steam treatment step is executed subsequently to the tempering step of performing tempering, and it is thus possible to achieve a relatively high flatness and suppress a variation in flatness. Given that the steam treatment step (instead of the tempering step) is executed subsequently to the cooling step, during the steam treatment step, residual austenite is transformed into martensite with the workpiece unpressurized. The workpiece is hardened with distortion of the workpiece occurring during the heating and cooling steps not eliminated. Therefore, even when the workpiece is subsequently tempered under pressure, the resultant sliding member has a reduced flatness.

The tempering in the tempering step is executed subsequently to the cooling step and thus the appropriate flatness can be achieved. The tempering in the tempering step further enables the residual austenite to be transformed into martensite while pressurizing the workpiece to eliminate distortion in the workpiece. Thus, the flatness can be further improved. In the tempering step, the residual austenite is transformed into martensite so that the sliding member has an appropriate hardness at the front surface side thereof.

In the heating step, the heating is performed in the atmosphere containing ammonia. In other words, the workpiece is nitrided in the heating step. The temperature in the heating step is 570 to 660° C. Heating at 570° C. or higher reliably allows each of the nitrogen compound layer 130 and the nitrogen diffusion layer 120 to have a thickness of 5 to 50 μm. A heating temperature of 660° C. or higher allows possible diffusion and extinction of the nitride compound to be suppressed. Therefore, the sliding member can have the appropriate hardness at the front surface side thereof. When the atmosphere temperature in the heating step is set to at least 590° C., which is an A1 transformation point of Fe—N, each of the nitrogen compound layer 130 and the nitrogen diffusion layer 120 can more reliably have a thickness of 5 to 50 μm.

Since the nitrogen compound layer 130 and the nitrogen diffusion layer 120 are each 5 to 50 μm in thickness, the sliding member can have a high hardness at the front surface side thereof. Since the oxidation layer 140 is 0.3 to 3 μm in thickness, appropriate wear resistance can be reliably offered. In the cooling step, a coolant is oil and no water is used as a coolant. This allows the surface of the sliding member to be restrained from being rusted.

In the present embodiment, the tempering is performed at 200 to 470° C. in the tempering step. Since the tempering is performed at 200 to 470° C., the residual austenite is transformed into martensite to stabilize the nitriding layers (the nitrogen compound layer 130 and the nitrogen diffusion layer 120). Therefore, the sliding member can have the appropriate hardness at the front surface side thereof.

In the present embodiment, the steam treatment is performed at 350 to 500° C. in the steam treatment step. Since the steam treatment is performed at 350 to 500° C., a dense oxidation layer 140 of triiron tetraoxide can be more reliably formed. The oxidation layer 140 can reliably have a thickness of 0.3 to 3 μm.

In the present embodiment, the treatment in each step is performed on the workpiece, on which annealing has not been performed. In the manufacturing method for a sliding member and the sliding member, the cooling in the cooling step, the tempering in the tempering step, and the steam treatment in the steam treatment step are performed in this order as described above. Thus, even when the annealing is not performed before the steps, a high flatness can be achieved. Thus, the sliding member can be manufactured at low costs by omitting the annealing.

The present embodiment further includes, immediately before the heating step, the pre-oxidation step of performing pre-oxidation in which heating is executed in an oxidation atmosphere at 300 to 450° C. Consequently, the pre-oxidation in the pre-oxidation step is performed before the workpiece is nitrided during the heating in the heating step. Thus, nitriding reaction in the heating step can be promoted. This reliably allows each of the nitrogen compound layer 130 and the nitrogen diffusion layer 120 to have a thickness of 5 to 50 μm.

The manufacturing method for a clutch plate according to the present embodiment is a manufacturing method for a clutch plate included in an electromagnetic clutch. The above-described manufacturing method for a sliding member is used as the manufacturing method for a clutch plate.

The clutch plate according to the present embodiment is a clutch plate included in an electromagnetic clutch. The above-described sliding member is used as the clutch plate.

The manufacturing method for a clutch plate in an electromagnetic clutch apparatus in the present embodiment and the clutch plate produce the same effects as those of the above-described manufacturing method for a sliding member and the above-described sliding member. The nitrogen compound layer 130 and the nitrogen diffusion layer 120 are each 50 μm in thickness. A thickness of more than 50 μm reduces magnetic permeability, leading to a reduced magnetic flux density of clutch plates and a reduced frictional engaging force between the clutch plates. Thus, the thickness is 50 μm or less.

Since the clutch plate offers a high wear resistance, the depth of wear of the clutch plate can be kept low even when the clutch plate is used for a long period of time. This prevents a significant change in the contact area between the clutch plates caused by wear of the clutch plates. This enables a reduction in the rate of change in transmission torque resulting from a long period of use.

Execution of the tempering step allows transformation of the residual austenite that is contained in the nitrogen compound layer 130 and the nitrogen diffusion layer 120 and that is nonmagnetic to be transformed into martensite, which is magnetic. This enables the magnetic permeability and hardness of the clutch plate to be increased.

Now, a driving-force transmission apparatus 1 to which the above-described clutch plate in the electromagnetic clutch apparatus is applied will be described with reference to FIG. 9. The driving-force transmission apparatus 1 is applied to a driving-force transmission system for an assist driving wheel in a four-wheel drive vehicle, to which a driving force is transmitted depending on a traveling state of the vehicle. More specifically, in the four-wheel drive vehicle, the driving-force transmission apparatus 1 is coupled between a propeller shaft to which the driving force of an engine is transmitted and a rear differential. The driving-force transmission apparatus 1 transmits a driving force transmitted from the propeller shaft, to the rear differential, while varying a transmission ratio. For example, if a difference in rotation speed occurs between front wheels and rear wheels, the driving-force transmission apparatus 1 acts to reduce the difference in rotation speed.

The driving-force transmission apparatus 1 is so-called an electronic control coupling. As depicted in FIG. 9, the driving-force transmission apparatus 1 includes an outer case 10 serving as an outer rotating member, an inner shaft 20 serving as an inner rotating member, a main clutch 30, an electromagnetic clutch apparatus 40 included in a pilot clutch mechanism, and a cam mechanism 50.

The outer case 10 is supported at an inner peripheral side of a cylindrical hole cover (not depicted in the drawings) so as to be rotatable with respect to the hole cover. The outer case 10 is shaped generally like a cylinder and includes a front housing 11 arranged on a front side of the vehicle and a rear housing 12 arranged on a rear side of the vehicle.

The front housing 11 is formed of, for example, an aluminum alloy of a nonmagnetic material containing aluminum as a main component, and is shaped like a bottomed cylinder. An outer peripheral surface of a cylindrical portion of the front housing 11 is supported by an inner peripheral surface of the hole cover so as to be rotatable via a bearing. The front housing 11 is coupled at the bottom thereof to a vehicular rear end side of the propeller shaft (not depicted in the drawings). In other words, the front housing 11 is arranged such that an opening of the bottomed-cylinder-shaped front housing 11 faces the vehicle rear side. A female spline 11a is formed on an inner peripheral surface of the front housing 11 at a central portion thereof in an axial direction and an internal thread is formed on an opening-side portion of the inner peripheral surface.

The rear housing 12 is shaped like a ring and arranged inside the opening-side portion of the front housing 11 in a radial direction so as to be integrated with the front housing 11. An annular groove is formed on the vehicular rear side of the rear housing 12 all along a circumference thereof. An annular member 12a formed of, for example, stainless steel, which is a nonmagnetic material, is provided in a part of the bottom of the annular groove in the rear housing 12. The portions of the rear housing 12 other than the annular member 12a are formed of a material containing iron (hereinafter referred to as an iron-based material), which is a magnetic material, as a main component so as to form a magnetic circuit. An external thread is formed on an outer peripheral surface of the rear housing 12 and fastened to the internal thread of the front housing 11. The front housing 11 and the rear housing 12 are fixed together by fastening the internal thread of the front housing 11 to the external thread of the rear housing 12 and bringing an opening side end surface of the front housing 11 into abutting contact with an end surface of a step portion of the rear housing 12.

The inner shaft 20 is shaped like a shaft including a male spline 20a on an outer peripheral surface of the inner shaft 20 at a central portion thereof in the axial direction. The inner shaft 20 passes through, in a liquid-tight manner, a through-hole located in the center of the rear housing 12 and is arranged in the outer case 10 so as to be relatively rotatable and coaxial with respect to the outer case 10. The inner shaft 20 is rotatably supported by the front housing 11 and the rear housing 12 via bearings, with an axial position of the inner shaft 20 regulated with respect to the front housing 11 and the rear housing 12. A vehicular rear end side (a right side in FIG. 9) of the inner shaft 20 is coupled to a differential gear (not depicted in the drawings). A space defined by the outer case 10 and the inner shaft 20 in a liquid tight manner is filled with a lubricant at a predetermined fill factor.

The main clutch 30 transmits a torque between the outer case 10 and the inner shaft 20. The main clutch 30 is a wet multi-disc friction clutch formed of the iron-based material. The main clutch 30 is arranged between an inner peripheral surface of the cylindrical portion of the front housing 11 and an outer peripheral surface of the inner shaft 20. The main clutch 30 is arranged between the bottom of the front housing 11 and a vehicular front end surface of the rear housing 12. The main clutch 30 includes inner main clutch plates 32 and outer main clutch plates 31 that are alternately arranged in the axial direction. A female spline 32a is formed on an inner periphery of each of the inner main clutch plates 32 and fitted over the male spline 20a on the inner shaft 20. A male spline 31a is formed on an outer periphery of each of the outer main clutch plates 31 and fitted in the female spline 11a on the front housing 11.

The electromagnetic clutch apparatus 40 attracts an armature 43 toward a yoke 41 by a magnetic force to engage pilot clutches 44 with each other. In other words, the electromagnetic clutch apparatus 40 transmits a torque of the outer case 10 to a support cam member 51 included in the cam mechanism 50. The electromagnetic clutch apparatus 40 includes the yoke 41, an electromagnetic coil 42, the armature 43, and a pilot clutch 44.

The yoke 41 is annularly formed and housed in the annular groove in the rear housing 12 via a clearance so as to be rotatable relative to the rear housing 12. The yoke 41 is fixed to the hole cover. The yoke 41 is rotatably supported at an inner periphery thereof by the rear housing 12 via a bearing. The electromagnetic coil 42 is shaped like a ring by winding a wire around the yoke 41 and is fixed to the yoke 41.

The armature 43 is formed of an iron-based material. The armature 43 is shaped like a ring including a male spline on an outer periphery of the ring. The armature 43 is arranged between the main clutch 30 and the rear housing 12 in the axial direction. The outer periphery of the armature 43 is fitted on the female spline 11a of the front housing 11. A current supplied to the electromagnetic coil 42 causes the armature 43 to be attracted toward the yoke 41.

The pilot clutch 44 transmits a torque between the outer case 10 and the support cam member 51. The pilot clutch 44 is formed of the iron-based material. The pilot clutch 44 is arranged between the inner peripheral surface of the cylindrical portion of the front housing 11 and an outer peripheral surface of the support cam member 51. The pilot clutch 44 is arranged between the armature 43 and the vehicular front end surface of the rear housing 12. The pilot clutch 44 includes an inner pilot clutch plate 44a (depicted in FIG. 9 and FIG. 11) and an outer pilot clutch plate 44b (depicted in FIG. 9 and FIG. 10) that are alternately arranged in the axial direction. A female spline is formed on an inner periphery of the inner pilot clutch plate 44a and fitted over a male spline of the support cam member 51. A male spline is formed on an outer periphery of the outer pilot clutch plate 44b and fitted in the female spline 11a of the front housing 11.

Figure 9:
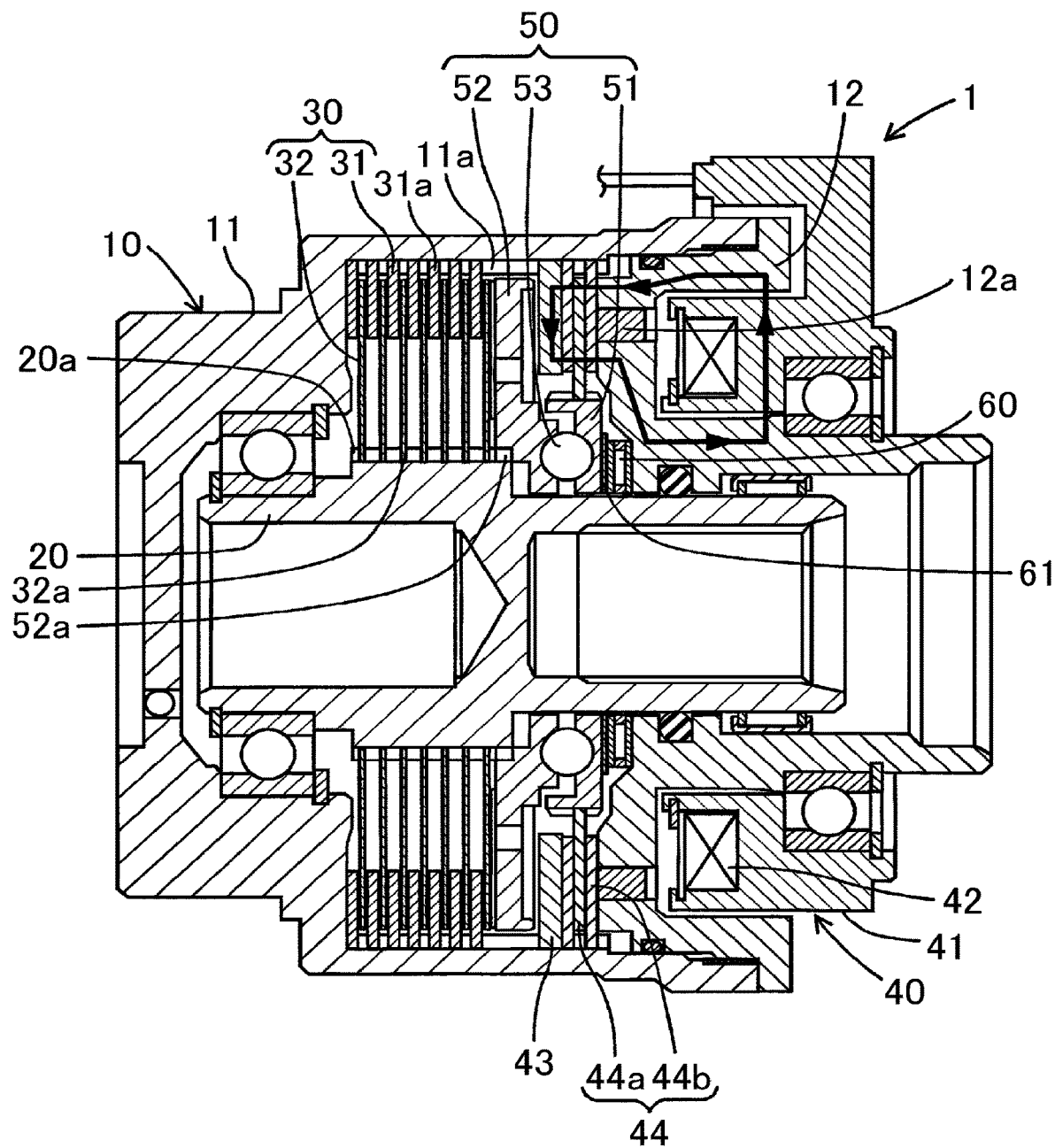
FIG. 9 is an axial sectional view of a driving-force transmission apparatus to which the clutch plate in the present embodiment is applied.

A current supplied to the electromagnetic coil 42 forms a magnetic circuit passing through the yoke 41, the outer peripheral side of the rear housing 12, the pilot clutch 44, the armature 43, the pilot clutch 44, the inner peripheral side of the rear housing 12, and the yoke 41 as depicted by arrows in FIG. 9. Then, the armature 43 is attracted toward the yoke 41 to bring the inner pilot clutch plate 44a and the outer pilot clutch plate 44b into frictional engagement with the each other. The torque of the outer case 10 is transmitted to the support cam member 51. On the other hand, interruption of current supplied to the electromagnetic coil 42 eliminates the attractive force exerted on the armature 43 to release the frictional engaging force exerted between the inner pilot clutch plate 44a and the outer pilot clutch plate 44b.

The cam mechanism 50 is provided between the main clutch 30 and the pilot clutch 44 to convert a torque transmitted via the pilot clutch 44 and based on the difference in rotation speed between the outer case 10 and the inner shaft 20, into an axial pressing force to press the main clutch 30. The cam mechanism 50 includes the support cam member 51, a moving cam member 52, and a cam follower 53.

The support cam member 51 is shaped like a ring including a male spline on an outer periphery of the ring. A cam groove is formed in a vehicular front end surface of the support cam member 51. The support cam member 51 is provided over the outer peripheral surface of the inner shaft 20 via a clearance and supported by the vehicular front end surface of the rear housing 12 via a thrust bearing 60. Therefore, the vehicular rear end surface of the support cam member 51 is in abutting contact with a bearing washer of the thrust bearing 60 via a shim 61. That is, the support cam member 51 is rotatable relative to the inner shaft 20 and the rear housing 12 and is regulated in the axial direction. The male spline of the support cam member 51 is fitted in the female spline of the inner pilot clutch plate 44a.

The moving cam member 52 is mostly formed of an iron-based material and shaped like a ring including a female spline on an inner periphery of the ring. The moving cam member 52 is arranged at a vehicular front position with respect to the support cam member 51. A cam groove is formed in a vehicular rear end surface of the moving cam member 52 so as to face the cam groove in the support cam member 51 in the axial direction. A female spline on the moving cam member 52 is fitted over the male spline 20a on the inner shaft 20. Therefore, the moving cam member 52 rotates along with the inner shaft 20. A vehicular front end surface of the moving cam member 52 is ready to come into abutting contact with the inner main clutch plate 32 arranged at the vehicular rearmost position in the main clutch 30. When moving toward the vehicular front side, the moving cam member 52 is pressed against the inner main clutch plate 32 toward the vehicular front side.

The cam follower 53 is shaped like a ball and held between the cam grooves of the support cam member 51 and the moving cam member 52, which face each other. That is, when a difference in rotation speed occurs between the support cam member 51 and the moving cam member 52, the cam follower 53 and each of the cam grooves act to move the moving cam member 52 away from the support cam member 51 in the axial direction (toward the vehicular front side). The axial distance that the moving cam member 52 moves away from the support cam member 51 increases with an increase in torsion angle between the support cam member 51 and the moving cam member 52.

Now, basic operations of the driving-force transmission apparatus 1 configured as described above will be described. A case will be described where a difference in rotation speed occurs between the outer case 10 and the inner shaft 20. A current supplied to the electromagnetic coil 42 in the electromagnetic clutch apparatus 40 forms a loop-shaped magnetic circuit starting at the electromagnetic coil 42 and circulating through the yoke 41, the rear housing 12, and the armature 43.

The magnetic circuit thus formed causes the armature 43 to be attracted toward the yoke 41, that is, rearward in the axial direction. As a result, the armature 43 presses the pilot clutch 44 to bring the inner pilot clutch plate 44a and the outer pilot clutch plate 44b into frictional engagement with each other. Then, a rotary torque of the outer case 10 is transmitted to the support cam member 51 via the pilot clutch 44 to rotate the support cam member 51.

The moving cam member 52, spline-fitted over the inner shaft 20, rotates along with the inner shaft 20. Therefore, a difference in rotation speed occurs between the support cam member 51 and the moving cam member 52. Then, the cam follower 53 and each of the cam grooves act to move the moving cam member 52 in the axial direction with respect to the support cam member 51 (toward the vehicular front side). The moving cam member 52 presses the main clutch 30 toward the vehicular front side.

As a result, the inner main clutch plates 32 and the outer main clutch plates 31 come into abutting contact with each other and are brought into a frictional engaging state. Then, the rotary torque of the outer case 10 is transmitted to the inner shaft 20 via the main clutch 30. This enables a reduction in difference in rotation speed between the outer case 10 and the inner shaft 20. A frictional engaging force of the main clutch 30 can be controlled by controlling the amount of current supplied to the electromagnetic coil 42. Thus, the torque transmitted between the outer case 10 and the inner shaft 20 can be controlled by controlling the amount of current supplied to the electromagnetic coil 42.

What is claimed is:

1. A manufacturing method for a pilot clutch plate, comprising:
   a first step of heating a base material portion formed of a steel material in an atmosphere containing ammonia at 570 to 660° C. and then cooling the base material portion, to form a nitrogen diffusion layer on a front surface of the base material portion;
   a second step, performed subsequently to the first step, of tempering the base material portion while pressurizing the front surface of the base material portion having the nitrogen diffusion layer thereon, to form a nitrogen compound layer on a front surface of the nitrogen diffusion layer; and
   a third step, performed subsequently to the second step, of performing steam treatment on the base material portion having the nitrogen diffusion layer and the nitrogen compound layer thereon, to form an oxidation layer on a front surface of the nitrogen compound layer by sequential steps of:
      heating the base material portion having the nitrogen diffusion layer and the nitrogen compound layer thereon to an elevated treatment temperature in a nitrogen atmosphere, and maintaining the base material portion at the elevated treatment temperature in the nitrogen atmosphere for a time sufficient to preheat the workpiece, and
      maintaining the preheated workpiece at the elevated treatment temperature in a steam atmosphere for a time sufficient to form the oxidation layer on the front surface of the nitrogen compound layer.

2. The manufacturing method according to claim 1, wherein the third step is performed at 350 to 500° C. and under conditions such that the oxidation layer contains triiron tetraoxide as a main component.

3. The manufacturing method according to claim 2, wherein the tempering is performed at 200 to 470° C. in the second step.

4. The manufacturing method according to claim 1, wherein the elevated treatment temperature is between 350° C. and 500° C.

5. The manufacturing method according to claim 1, wherein the elevated treatment temperature is between 390° C. and 480° C.

* * * * *